United States Patent [19]

Stewart et al.

[11] 3,920,467

[45] Nov. 18, 1975

[54] CHEMICAL MODIFICATION OF ASPHALT TO IMPROVE DURABILITY

[75] Inventors: William T. Stewart; Robert J. Schmidt, both of El Cerrito, Calif.

[73] Assignee: Chevron Research Company, San Francisco, Calif.

[22] Filed: May 22, 1969

[21] Appl. No.: 827,066

[52] U.S. Cl. .............. 106/273; 106/278; 106/279; 208/22; 208/23; 208/44; 260/2 EP; 260/2.5 AM; 260/28; 260/28.5 AS; 260/77.5 CR

[51] Int. Cl.² C08L 95/00; C09D 3/24; C10C 1/20; C08L 91/00

[58] Field of Search ................. 106/122, 273–285; 208/22, 44, 23; 260/28, 28.5, 82, 96.5, 77.5 A, 858, 859, 77.5 CR, 77.5 C, 2 EP, 2.5, 2.5 AM, 77.5 CH, 77.5 AM

[56] References Cited
UNITED STATES PATENTS

| | | | |
|---|---|---|---|
| 2,247,375 | 7/1941 | Hersberger et al. | 106/273 X |
| 2,970,099 | 1/1961 | Illman | 208/23 |
| 3,015,635 | 1/1962 | Bradley et al. | 260/18 |
| 3,092,594 | 6/1963 | Heiss | 260/2.5 |
| 3,105,771 | 10/1963 | Simpson et al. | 260/28 X |
| 3,284,390 | 11/1966 | Scheibli et al. | 260/28 |
| 3,514,316 | 5/1970 | Kemp et al. | 117/75 |

*Primary Examiner*—Joseph L. Schofer
*Assistant Examiner*—Herbert J. Lilling
*Attorney, Agent, or Firm*—G. F. Magdeburger; C. J. Tonkin

[57] ABSTRACT

A method for enhancing the durability of asphalt which comprises reacting with the asphalt at elevated temperatures a modifying compound selected from the group consisting of:

1. R—NCO, in which R is hydrocarbyl of 1 to 24 carbon atoms;

2.

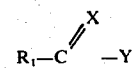

in which $R_1$ is H or R, X is $H_2$, O, S, C=O or

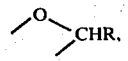

and Y is H, Cl, Br, I, or —O-acyl in which the acyl group is hydrocarbylacyl of from 1 to 20 carbon atoms, with the proviso that when Y is Cl, Br, or I, X is $H_2$; when Y is H, X is C=O or

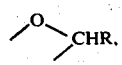

and 3. ethylene oxide.

9 Claims, No Drawings

CHEMICAL MODIFICATION OF ASPHALT TO IMPROVE DURABILITY

BACKGROUND OF THE INVENTION

1. Field of the Invention

The use of asphalt in various types of construction has been common for many years. Durability of the structures has always been a most important consideration in the economics of such construction, and particularly in the fields of highway and airport runway construction has the emphasis become more important. This has been due to the greatly increased airport and highway traffic loads, the greater number of heavy vehicles which use the highways, and the heavier aircraft on airport runways.

While advances in construction techniques have contributed to the enhancement of the lives of the asphalt based structures, a most important characteristic affecting structure life lies in the intrinsic durability of the asphalt itself. Probably the most important particular characteristic of the asphalt in resisting deterioration, particularly in paving applications, is the maintenance of the viscosity of the asphalt and concommitantly its ability to deform without rupture, to resist thermal stress, and to retain elastic recovery properties. Thus, the imposition of a heavy load on a pavement structure will cause a depression and deformation of the structure from which it must elastically recover. Aging of the asphalt will result over a period of years in the hardening of the asphalt binder and a consequent increase in viscosity of the asphalt, and thus will reduce the ability of the structure to recover from the strains imposed by heavy loads. Cracking of the structure will then ensue.

Thus, the hardening (increase in viscosity) just described occurs with all asphalts in varying degrees, and the degree of hardening which is directly related to durability is, in general, a function of the asphalt source, degree of purification, and treatment during recovery, etc.

Based upon the anticipated heavier loading requirements for highway construction, many governmental agencies have adopted new and much more stringent standards for asphalt durability. For example, the State of California, through the California Highway Department, has proposed tentative specifications which when adopted will be among the most stringent in the world. These specifications are set forth in an article by John Skog, "'Setting' and Durability Studies on Paving Grade Asphalts," Proceedings, Association of Asphalt Paving Technologists, 36, 1967, pp 387–420. In order to meet these specifications it has been necessary to be extremely selective in the choice of base asphalts, as few naturally derived asphalts can meet the stringent specifications.

In the past, attempts have been made to improve asphalt durability. In general such attempts have involved the addition of either antioxidant additives or polymeric materials in order to change the rheological properties of the base asphalts. Thus natural rubber, polyethylene, polystyrene-butadiene neoprene, butyl rubber, chloro-sulfonated polyethylene, polyfluoroethylene elastomers, polyacrylic acid esters, polysulfide elastomers, and epoxy resin have been employed in asphalts to change their properties.

Antioxidants which have been employed in asphalts include dialkylthioethers, organic phosphates, arylamines, pheneols, dibenzoyl resorcinol, tertiary butyl phenols, etc.

Another approach in changing the basic character of asphalt lies in modifying the basic structure of the asphalt components by reacting them with a modifying agent. For example, the melting point of asphalt has been raised without significant effect upon other characterics by reacting it with various agents. However, no significant effort to improve durability by means of chemical modification has heretofore been successful.

2. Description of the Prior Art

U.S. Pat. No. 2,247,375 discloses a process for raising the melting point of bituminous residua by contacting the residua with halogenated organic compounds at elevated temperatures, followed by substantial recovery of the halogenated organic compounds.

U.S. Pat. No. 2,970,099 discloses asphaltic compositions containing asphaltenes ring alkylated with alkyl halides by means of radiation or with the use of peroxide catalysts.

U.S. Pat. No. 3,061,538 discloses a method of increasing the softening point of asphalt by reacting the asphalt at elevated temperatures with dicarboxylic acids of 4 to 14 carbon atoms and anhydrides and acyl halides of such acids. Monocarboxylic acids were found to have no significant effect.

SUMMARY OF THE INVENTION

A process is provided for enhancing the durability of asphalt. The process comprises reacting with an asphalt at a temperature of from about 150° to 650°F., a modifying compound selected from the group consisting of:

1. R—NCO, in which R is hydrocarbyl of 1 to 24 carbon atoms;
2.

in which $R_1$ is hydrogen, or R, X is $H_2$, O, S, C=O or

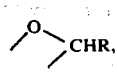

and Y is H, Cl, Br, I, or —O—acyl in which the acyl group is hydrocarbylacyl of 1 to 20 carbon atoms. It is further provided that when Y is Cl, Br, or I, X is O or $H_2$; when Y is H, X is C=O or

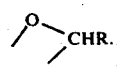

When the compound to be employed is

in which X is $H_2$, and Y is Cl, Br, or I, the asphalt, prior to the addition of the modifying compound, is reacted with an alkali metal at least in an amount sufficient to convert the nonhydrogen-bonded phenolic hydroxyl groups to alkali metal phenoxide groups. Further, when the reaction of the modifying agent (e.g., acyl halide) will produce hydrogen halide, it is necessary that sufficient base be present in the reaction mixture to substantially neutralize the hydrogen halide, and 3. ethylene oxide.

DESCRIPTION OF THE PREFERRED EMBODIMENTS

The phenolic hydrogen replacing reagents which may be employed in the processes of this invention include for example, anhydrides of hydrocarbyl monocarboxylic oxygen or sulfur acids, either alkyl or aryl, simple or mixed. These compounds are represented, when in

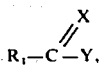

X is O or S, and Y is O-acyl.

Examples of the simple aliphatic anhydrides include acetic anhydride, propionic anhydride, hexanoic anhydride, octanoic anhydride, decanoic anhydride, etc. Examples of the mixed anhydrides are illustrated by the anhydride of propionic and acetic acids, the anhydride of hexanoic acid with propionic acid, etc. The aryl anhydrides are illustrated by benzoic anhydride and naphthenoic anhydride, etc. Mixed anhydrides of aromatic acids and mixed aromatic-aliphatic anhydrides are illustrated by the anhydrides of naphthenoic acid with benzoic acid and with acetic acid. The preferred anhydrides are those derived from acids of 2 to 10, preferably 2 to 4 carbon atoms.

Also suitable reagents are the ketenes, including ketene, itself, and the homologous aldo and ketoketenes. These compounds are represented, when in the formula

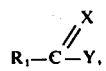

Y is H or hydrocarbyl and X is C=O. The aldoketenes are represented by the formula:

$$\begin{array}{c}R\\ \phantom{R}\diagdown\\ \phantom{RRR}C{=}C{=}O\\ \phantom{R}\diagup\\ H\end{array}$$

and the ketoketenes by the formula $$\begin{array}{c}R_1{-}C{=}C{=}O\\ \phantom{RRRRR}\diagup\\ R'\end{array}$$

in which $R_1$ is a hydrocarbyl group, preferably alkyl and R is as previously defined. The preferred materials are substituted with hydrocarbyl groups containing a total of 1 to 20 carbon atoms.

Other suitable agents are the acyl halides, usually the chlorides, of the acids from which the anhydrides previously described are derived. These materials are represented when, in the formula,

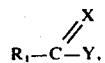

X is O, and Y is Cl, Br, or I. Thus, particularly efficacious are the halides of acetic, propionic, butanoic, pentanoic, hexanoic acids, etc. The sulfur acid derivatives are also effective.

Another class of effective agents are the alkyl or substituted alkyl monohalides. These compounds are represented when in the formula

Y is Cl, Br, or I, and X is $H_2$. Examples of these materials are methyl chloride, methyl bromide, methyl iodide, e.g., alkyl halides of 1 to 24 carbon atoms. The substituted materials are illustrated by benzyl chloride, 1-chloro-2-phenyl ethane, 1-bromo-3-phenyl propane, etc. The reaction of the asphalt with these agents is a Williamson synthesis and requires the prior addition of an alkali metal in order to form a phenoxide of the asphaltic component.

Another important class of materials which may be employed are the oxides such as ethylene oxide, propylene oxide, butylene oxide. A particularly important class of oxides which may be used is that of the cracked wax olefin oxides, from the epoxidation of cracked wax olefins. The preferred oxides are the lower alkyl terminal epoxides.

Another class of materials which may be effectively employed include aryl and alkyl monoisocyanates (R—NCO). They may be reacted directly with the bitumen to form urethane capped materials. Examples of suitable material include methyl isocyanate, ethyl isocyanate, propyl isocyanate, hexyl isocyanate, phenyl isocyanate, etc. The lower alkyl materials are preferred, e.g., those having from 1 to 6 carbon atoms.

The asphalt materials, the durability of which may be enhanced by the process of this invention include a wide variety of materials, including various asphalt residua, air-blown asphalts, solvent extracts, solvent deasphalter products, gilsonite, etc. Materials to which the processes of this invention are particularly applicable are the solvent deasphalter asphalts and these asphalts, which as originally constituted, fail to meet the high durability specifications previously referred to and which by treatment by this process reach such specifications. Examples of the latter materials are Boscan asphalts, which are derived from Venezuela produced crude oils and Santa Maria asphalt derived from a California crude.

The solvent deasphalter products which are advantageously treated by the process of this invention are the well known materials precipitated from various crude oil fractions with lower alkanes. The most common solvent deasphalter asphalts are precipitated with propane and are usually called "propane asphalts." These materials are commonly blended with other asphalts or oils to form useful materials. In broader aspect, the materials are produced by the solvent extraction of residual oils with pure or mixed saturated aliphatic hydrocarbon fractions having average molecular weights in the range of about 48 to about 114. A preferable molecular weight range of a solvent fraction is from about 46 to 54, more preferably from about 47.0 to 48.50. The preferred range is illustrated by mixtures of from about 55 to 70 percent propane with from about 30 to 45 percent by weight butane. Of course, other hydrocarbons, including pentane, hexane, heptane, and octane may be employed in proper quantities.

In the extraction process (used to produce the deasphalter asphalts) the temperature of the system is usually maintained in the range of from about 80°F. up to near the critical temperature of the hydrocarbon solvent fraction. A preferred method of operation is to maintain the temperature at about 40° to 60°F., more preferably about 50°F., less than the critical temperature. The system is, of course, kept under sufficient pressure to maintain the fluid character of the solvent during the extraction process. The asphaltic material precipitates from the mixture and is removed by conventional filtration techniques which are well known.

The reactions of this invention are carried out under conditions wherein oxygen is essentially excluded from the reaction mixture in order to prevent oxidation of the asphalt. Thus, the reactants may be conveniently purged by an inactive gas such as nitrogen or carbon dioxide. In the case of reaction with compounds such as anhydrides, acyl halides and ketenes, which are hydrolyzed by water, it is important that the reaction be carried out under substantially anhydrous conditions.

The reaction is usually carried out at a temperature of from about 150° to 650°F., preferably at a temperature of from 250° to 425°F. The reaction time will generally be from 1 to 24, more preferably from 2 to 12 hours. Depending upon the solubility of the reactants, a solvent, generally an aliphatic or aromatic hydrocarbon solvent may be employed in an amount sufficient to assure miscibility of the reactants.

As previously noted, when the monohalides are used to replace the phenolic hydrogens, it is first necessary to form the metal phenoxides of the bitumens. Preferably, these are the alkali metal phenoxides. This is preferably accomplished by reacting with the asphalt an alkali metal, an alkali metal alkoxide or a mixture of both in an amount sufficient to substantially react with all of the hydroxy groups present in the bitumen. Additionally, when alkyl halides and acyl halides are employed, since neutralization of the halo acid formed is necessary in order to prevent deterioration of the bitumen, prior preparation of the alkali metal phenoxide is the most convenient way of accomplishing this. The alkali metal or alkali metal alkoxide should be employed in an amount at least equal to the hydrogen-replacing agent that is used and preferably is employed in a molar excess of 1.5–5 to 1.

When the other modifying agents, particularly the alkylene oxides are employed, the use of alkali metals and alkali metal alkoxides in the process should be avoided.

The modifying agent is preferably employed in an amount sufficient to decrease the amount of nonhydrogen bonded OH groups in the asphalt measured by IR absorption analysis at a frequency of 3,600–50 cm$^{-1}$, the sample being dissolved in carbon tetrachloride. This amount will usually be at least equal to one theory of the agent for each theory of nonhydrogen bonded hydroxyl in the original asphalt. In some cases, particularly with the oxides, it is preferable to employ an excess of the agent over theoretical. The oxides, after substitution of one mole from a hydroxyl group which can react with a second mole of the oxide; thus, an excess as high as 10 theories of oxide per theory of nonhydrogen bonded hydroxyl in the bitumen can be employed.

At the end of the reaction period, excess volatile reagent or the volatile by-product of the reaction (e.g., acetic acid) may be removed from the reaction mixture by distillation at atmospheric pressure, or preferably under reduced pressure.

The following examples illustrate the processes of this invention. In each case rheological and other data on each asphalt and product will be found in the tables following. The examples are intended to be simply illustrative and nonlimiting.

EXAMPLE 1

Acetylation of Boscan Asphalt

A 501.5 gram portion of Boscan asphalt (derived from Western Venezuelan crude) was dissolved in 100 ml. of toluene in a reaction flask and the resulting mixture was heated to reflux. A 15 ml. portion of acetic anhydride dissolved in 25 ml. of toluene was added to the refluxing asphalt solution. Refluxing was continued for 8 hours and 45 minutes, at which time the reaction mixture was allowed to cool. Refluxing was resumed the next day for a period of 7½ hours. The reaction mixture was then cooled and topped to a bottoms temperature of 325°F. under a pressure of 5 mm. of mercury. It was subsequently retopped to 319°F. at 0.8 mm. of mercury. The net weight of the product was 502.4 grams.

EXAMPLE 2

Methylation of Boscan Asphalt

A 500 gram portion of the Boscan asphalt used in Example 1 was dissolved in 100 ml. of toluene. To this mixture was added 7 grams of sodium methylate and 50 ml. of anhydrous methyl alcohol. The mixture was stirred for 1 hour at room temperature and then refluxed for ½ hour. At this time the equipment was set up for distillate removal; 30 grams of liquid were taken over. A 50 ml. portion of toluene was added and distillation was continued. Three subsequent additions were made of 50 ml. toluene portions at such time as 50 ml. of distillate had been collected. Two additional 50 ml. charges of toluene were made followed by the addition of 200 ml. of toluene. Distillation was continued until an additional 44 ml. of toluene were removed. The mixture was then charged to a pressure bomb, and 17 grams of methyl bromide in 100 ml. of toluene were added. The mixture was then reacted under autogenous pressure for 10 hours at about 370°F. The mixture was then transferred to a beaker and the bomb was washed with a small amount of benzene. The washings were added to the reaction mixture which was heated to reflux on a steam plate, removing the unreacted methyl bromide. The reaction mixture was then diluted with an equal volume of chloroform and methyl alcohol and washed 3 times with dilute hydrochloric acid and finally with water. The water was removed from the organic phase by stripping with a 50/50 blend of toluene and isopropyl alcohol. The reaction mixture was then stripped to 300°F. under a pressure of 1 mm. of mercury. The net weight of the product was 400.2 grams.

In order to determine the effect upon the asphalt of the treatments effected in Examples 1 and 2 the asphalts were subjected to commonly accepted durability tests which have been correlated to actual pavement durability. These tests include the "Rolling Thin Film" (RTF) Test, California Highway Method No. 346C, and the Thin Film Durability Test, also called the "Thin Film Plate" (TFP) Test. The latter test is described in an article "Proposed: A New Test and Specifications for Paving Grade Asphalts" F. N. Hveem, E. Zhube, and J. Skog, Proceedings AAPT, Volume 32 p. 271 (1963). The RTF test is used to predict the hardening of the asphalt during mixing with hot aggregate and the subsequent TFP test is used to predict the life long term pavement life of the asphalt.

The following table sets forth Rolling Thin Film and Thin Film Durability Test data obtained from the original and treated asphalts of Examples 1 and 2 plus estimated data from the best fractionated Boscan asphalt. In addition, viscosity and penetration of the original and treated materials are set forth.

materials equal the Smackover asphalt in shear viscosity and exceed it in microductility.

In order to further determine the significance of the effects achieved by the processes of this invention, two newly developed tests were employed. These tests have been found to correlate with actual pavement durability equally as well as the previously described Rolling Thin Film and Thin Film Plate Tests and are simpler to perform an provide better repeatability. These tests are entitled the Rolling Microfilm Test (RMF) and the Rolling Microfilm on Original Asphalt Test (RMFO). The tests and their correlations to pavement durability are described in two papers: L. E. Santucci and R. J.

TABLE I

CHEMICAL TREATMENT OF BOSCAN ASPHALTS

| Asphalt | Original Asphalt | | | RTF Residue Viscosity 140°F cp × 10⁵ | TFP Residue at 77°F | | |
|---|---|---|---|---|---|---|---|
| | Penetration at 77°F | Viscosity 140°F cp × 10⁵ | 275°F cs | | Viscosity × 10 Poises | | Microductility mm |
| | | | | | 0.05 Sec⁻¹ | 0.001 Sec⁻¹ | |
| Untreated Boscan | 90 | 2.4 | 506 | 7.2 | | | |
| Acetylated Boscan | 90 | 2.6 | 495 | 7.5 | 26 | 34 | 6 |
| Methylated Boscan | 85 | 2.6 | 522 | 7.6 | 28 | 45 | 6 |
| Best Fractionated Boscan (Interpolated) | 83 | 2.6 | 545 | 7.5 | 41 | 125 | 5 |

It may be seen from these data that the TFP test gave substantial reductions in viscosity at 77°F. of the residues from the asphalt after the TFP Test exposure. From an original 41 millipoises viscosity at $0.05^{-1}$ shear rate, the treated materials hardened only to 26 and 28 millipoises, respectively. Comparisons at $0.001^{-1}$ shear rate showed even greater differences: 125 millipoises for the original compared with 35 millipoises for the treated materials. The RTF viscosities and microductilities are also equal to results obtained with the best fractionated Boscan asphalt.

The following table shows the properties of the same asphalts adjusted to a 4.5 kp viscosity at 140°F. after the Rolling Thin Film (RTF) oven exposure (A range of 4-6 kp RTF viscosity at 140°F. is specified in the previously mentioned California Department of Highways specifications). These specifications are shown in the table, and for comparison purposes, the properties of a typical Smackover asphalt, one of the most durable asphalts known, is included.

Schmidt, "The Effect of Asphalt Properties on the Fatigue Resistance of Asphalt Paving Mixtures," Association of Asphalt Paving Technologists, 1969, and R. J. Schmidt and l. E. Santucci, "The Effect of Asphalt Properties on the Fatigue Cracking of Asphalt Concrete on the Zaca-Wigmore Test Project," Association of Asphalt Paving Technologists, 1969.

The viscosities are calculated from these tests at a constant stress rather than under a constant rate of shear as in the RTF test. The utilization of constant stress gives generally better reproducibility than the constant strain technique previously employed in the RTF test.

EXAMPLE 3

Acetylation of solvent Deasphalter Bottoms with One Theory of Acetic Anhydride

A 4000 g. portion of solvent deasphalter bottoms derived by extraction of a crude oil fraction with a mixture of $C_2$–$C_3$ alkanes was weighed into a 12 liter, 1

TABLE II

RTF AND TFP VISCOSITIES ASPHALTS ADJUSTED TO 4.5 KILOPOISE

| Asphalt | RTF Residue Viscosity 140°F cp × 10⁵ | TFP Residue at 77°F | | Microductility mm |
|---|---|---|---|---|
| | | Viscosity × 10 Poises | | |
| | | 0.05 Sec⁻¹ | 0.001 Sec⁻¹ | |
| California Division of Highways Specifications | 4–6 | 25 Max. or 20 Max. | 60 | 10 Min. 7 Min. |
| Best Fractionated Boscan | 4.5 | 27 | 104 | 6 |
| Acetylated Boscan (Interpolated) | 4.5 | 21 | 30 | 11 |
| Methylated Boscan (Interpolated) | 4.5 | 23 | 41 | 11 |
| Smackover | 4.5 | 16 | 43 | 7 |

It may be seen from these data that the treated materials of Examples 1 and 2 easily pass the rigid requirements of the California Highway Department, whereas the interpolated values for the best fractioned Boscan-type asphalt fail by a significant margin. The treated neck boiling flask, and the flask was placed on a heating mantle with a stirring assembly, and nitrogen purging apparatus. The material was heated to a temperature of 380°F. and the introduction of nitrogen purge was begun. At the end of the purging, the temperature had dropped to 306°F. The temperature was then raised to 350°F. and one theory (approximately 16 ml.) of acetic anhydride was added over a period of 8 minutes. Theory was calculated as 1 mole of acetic anhydride per mole of hydroxyl in the bitumen determined by IR analysis. The material was then stirred at a temperatue of 350°± 10 ° for a period of 7½ hours and then allowed to cool. The analysis of the product showed 15.9 moles of carbonyl per gram bitumen.

EXAMPLE 4

Acetylation of Solvent Deasphalter Bottoms with 10 Theories of Acetic Anhydride

The procedure of Example 3 was followed with the exception that nitrogen was blown over the surface of the asphalt for 3½ hours, and 10 theories (150 ml.) of acetic anhydride were added over a 10-minute period. Again, the reaction was allowed to proceed for approximately 7½ hours.

EXAMPLE 5

Acetylation of Solvent Desphalter Bottoms with ½ Theory of Acetic Anhydride

The procedure of Example 3 was followed with the exception that 8 ml. of acetic anhydride (½ theory) was added and the reaction was allowed to continue for 1½ hours.

EXAMPLE 6

Acetylation of Solvent Deasphalter bottoms with 2 Theories of Acetic Anhydride

The procedure of Example 3 was followed with the exception that the reaction time was 1 hour and 15 minutes and 32 ml. (2 theories) of acetic anhydride were employed.

EXAMPLE 7

Reaction of Solvent Deasphalter Bottoms with Ethylene Oxide 200 g. of solvent deasphalter bottoms were placed in a Fischer-Porter bottle. The bottle and its contents were placed on a hot plate in an oil bath. While being heated a stream of nitrogen was passed over the sample. After the bitumen had melted, a flow of nitrogen was bubbled through the sample for 1 hour. Approximately 0.20 of sodium metal were added to the sample and stirred in. The bottle was connected to an ethylene oxide supply system. The entire system was flushed twice with nitrogen prior to the ethylene oxide introduction. Ethylene oxide was introduced into the system when the temperature of the oil bath reached 408°F. Approximately 1.2 ml. of liquid ethylene oxide were added to reach a pressure f 15 of psi gauge. Heating of the system was continued for a period of 3 hours and 32 minutes until the pressure dropped to 11.5 inches (Hg vacuum).

EXAMPLE 8

Reaction of Solvent Deasphalter Bottoms with Propylene Oxide

A 132 g. portion of solvent deasphalter bottoms and 68.0 g. of topped Sumatran light foots oil were placed into a Fischer-Porter bottle and following the procedure of Example 7, 20 ml. (1.37 theories) of liquid propylene oxide were added. Pressure dropped from 9 psi gauge to −10.5 inches Hg. vacuum in approximately 40 minutes.

EXAMPLE 9

Reaction of Sulfur Deasphalter Bottoms with Phenyl Isocyanate

A 540-gram portion of sulfur deasphater bottom was weighed into a tared, 3-necked, 2,000 ml. boiling flask. 215 ml. of benzene were added. The flask was placed upon a heating mantle, and after about 1½ hours had softened to stirring consistency. The contents of the flask were boiled at about 190°F. Between 50 and 70 ml. of benzene were distilled off to raise the boiling temperature to about 235°F. 2.7 grams (1 theory) of phenyl isocyanate were added to the contents of the flask, and the material was allowed to stir for 2 hours and 10 minutes at 235°± 5°F. The mantle was then turned off, and nitrogen gas was allowed to pass over the surface of the material overnight. The heating mantle was again turned on, and after ½ hour 266 grams of topped Sumatran light foots oil were added. The material was allowed to stir while molten for ½ hour. It was then removed from the flask, and the benzene was removed by distillation.

EXAMPLE 10

Reaction of Solvent Deasphalter Bottoms with 2 Theories of Phenyl Isocyanate

The procedure of Example 9 was repeated with the exception that 500 grams of solvent deasphalter bottoms, 5.0 grams (2 theories) of phenyl isocyanate, and 46 grams of foots oil were employed.

The product of each of Examples 3 to 10 was blended with topped Sumatran light foots oil to give a blend having 34 percent by weight of the foots oil and 66 percent by weight of the modified asphalt. The blending was done in order to adjust the penetration of the sample to the range of about 90 to 110 to facilitate comparison of the samples. Penetration, original viscosities, and RTF and RMFO viscosities of the unreacted blend and the blends of the modified asphalts are included in the following table. Additionally, there is set forth in the last column the extrapolated RMFO viscosities of unmodified asphalt-oil blends having penetrations corresponding to those of the equivalent modified material.

TABLE III

MODIFICATION OF SOLVENT DEASPHALTER BOTTOMS

| Example | Modifying Agent Type | Theories | Penetration at 77°F. | Original Viscosity 140°F. | Original Viscosity 275°F. | Rolling Thin Film (RFT) Viscosity 140°F. | Rolling Thin Film (RFT) Viscosity 275°F. | Rolling Microfilm On Original Asphalt (RMFO) Viscosity, 77°F. (e) |
|---|---|---|---|---|---|---|---|---|
| | | | (a) | (b) | (c) | (b) | (d) | (f) |
| Solvent Deasphalter Bottoms | — | — | 109 | 1.12 | 227.1 | 4.38 | 391 | 1206 (1206) |
| 3 | Acetic Anhydride | 1 | 95 | 1.34 | 242.1 | 5.54 | 464 | 1025 (1375) |
| 4 | do | 10 | 110 | 1.16 | 243.0 | 3.60 | 392 | 195 (1190) |

TABLE III-continued
MODIFICATION OF SOLVENT DEASPHALTER BOTTOMS

| Example | Modifying Agent Type | Theories | Penetration at 77°F. | Original Viscosity 140°F. | Original Viscosity 275°F. | Rolling Thin Film (RFT) Viscosity 140°F. | Rolling Thin Film (RFT) Viscosity 275°F. | Rolling Microfilm On Original Asphalt (RMFO) Viscosity, 77°F. (e) | |
|---|---|---|---|---|---|---|---|---|---|
| | | (a) | | (b) | (c) | (b) | (d) | | |
| 5 | do | 0.5 | 89 | 1.39 | 377.1 | 5.80 | 421.2 | 1088 | (1500) |
| 6 | do | 2 | 99 | 1.28 | 251.1 | 4.42 | 427 | 656 | (1325) |
| 7 | Ethylene Oxide | 1.21 | 96 | 5.30 | — | — | — | 1043 | (1350) |
| 8 | Propylene Oxide | 1.37 | 118 | 4.27 | 366.6 | 4.27 | 366 | 690 | (1060) |
| 9 | Phenyl Isocyanate | 1 | 75 | 1.94 | 275 | 7.14 | 492 | 1342 | (1800) |
| 10 | do | 2 | 70 | 1.96 | 292 | 7.28 | 510 | 1156 | (1900) |

(a) Relative to Non H-Bonded OH in Asphalt
(b) Kilopoises
(c) Centistokes
(d) Centipoises
(e) Megapoises
(f) RMFO Viscosity of Unmodified Solvent Deasphalter Bottoms - Sumatran Light Foots Oil at Equivalent Penetration (77°F.)

As can be seen from these data, treatment with the enumerated agents resulted in significant reductions in the RMFO viscosities without adversely affecting the penetration of the material. Note particularly that treatment with 10 moles of acetic anhydride (Example 4) resulted in a 6-fold decrease in the RMFO viscosity.

EXAMPLE 11
Acetylation of Boscan Asphalt with One Theory of Acetic Anhydride Into a tared 2-liter 3-necked boiling flask was weighed a 550-gram portion of Boscan asphalt. The asphalt had a non-hydrogen bonded OH content of 15 micromols per gram. The flask was placed, heating was begun, and a flow of nitrogen was passed over the sample. The temperature of the sample was gradually raised to about 340°F. over a period of about one hour. Stirring of the sample was begun, and 0.9 grams (one theory relative to OH in asphalt) of acetic anhydride was introduced. At this point the nitrogen flow was removed and a reflux condenser was attached to the flask. The reaction was allowed to continue for two hours, the temperature rising to 360°F. The reflux condenser and thermometer were removed, and the into inlet tube was placed under the surface of the sample, and stirring was continued for 2 hours, at which time the product was poured from the flask into storage containers.

EXAMPLE 12
Acetylation of Boscan Asphalt with Two Theories of Acetic Anhydride The procedure of Example 11 was followed with the exception that two theories of acetic anhydride were employed.

EXAMPLE 13
Acetylation of Boscan Asphalt with Ten Theories of Acetic Anhydride The procedure of Example 11 was followed with the exception that 8.0 moles (10 theories) of acetic anhydride were used.

EXAMPLE 4
Methylation of Boscan Asphalt with 2.3 Theories of Methyl Chloride A 150-gram portion of Boscan asphalt was placed into a tared Fischer-Porter bottle. The bottle was placed in an oil bath, and nitrogen was blown over the surface until the temperature of the bath reached 300°F. Two theories each of Na and NaOCH$_3$ (theories based on hydroxyl content of asphalt) were added to the bottle. The bottle's contents were then flushed three times with nitrogen and vented three times. Stirring of the sample was started, the pressure being released from time to time. Stirring was continued for 3 hours. Then the bottle was evacuated 3 times with full house vacuum and flushed twice with nitrogen. Addition of methyl chloride was started. The pressure gauge read —26½ inches Hg. at the beginning, and the bottle was pressurized until 0 gauge pressure was reached. Theories reacted were calculated as 2.3. The bottle was then evacuated, the unit allowed to cool, and the product removed.

EXAMPLE 15
Methylation of Boscan Asphalt with 4.7 Theories of Methyl Chloride The procedure of Example 14 was followed with the exception that two theories of sodium, eight theories of sodium methylate, and 4.7 theories of methyl chloride were employed.

EXAMPLE 16
Reaction of Boscan Asphalt with 2.14 Theories of Ethylene Oxide

In a manner similar to that described in Example 7, a 141-gram portion of Boscan asphalt was reacted with 2.14 theories of ethylene oxide at a temperature of about 300°±5°F. over a period of about 2 hours and 21 minutes.

EXAMPLE 17
Reaction of Boscan Asphalt with 3.4 Theories of Ethylene Oxide

Following the procedure of Example 16, 146 grams of the Boscan asphalt were reacted with 3.4 theories of ethylene oxide.

EXAMPLE 18

Reaction of Boscan Asphalt with 2.5 Theories of Ethylene Oxide with Prior Addition of Metallic Sodium 150 grams of Boscan asphalt were reacted with 2.5 theories of ethylene oxide following the procedure of Example 15, with the exception that 0.1 grams (2 theories) of metallic sodium were added to the reaction mixture and allowed to dissolve for about 2 hours before ethylene oxide addition began. The temperature during ethylene oxide addition was 305°± 1°F., and the addition took 1 hour and 35 minutes.

EXAMPLE 19

Reaction of Boscan Asphalt with 3.6 Theories of Ethylene Oxide with Prior Addition of Metallic Sodium The procedure of Example 18 was followed with the exception that 3.6 theories of ethylene oxide were employed and 2½ hours were allowed for sodium dissolution.

EXAMPLE 20

Reaction of Boscan Asphalt with 5 Theories of Ethylene Oxide

The general procedure of Example 16 was followed employing 150 grams of Boscan asphalt with 5.0 theories of ethylene oxide and a reaction temperature of 315°± 5°F. for a period of 1 hour and 23 minutes.

EXAMPLE 21

Reaction of Boscan Asphalt with 3.4 Theories of Propylene Oxide

The general procedure of Example 16 was followed using 152 grams of Boscan asphalt and substituting 3.4 theories of propylene oxide for the ethylene oxide. The reaction was allowed to proceed for 2 hours and 2 minutes at a temperature of 307°± 2°F.

EXAMPLE 22

Reaction of Boscan Asphalt with 6.0 Theories of Propylene Oxide

The procedure of Example 21 was followed employing 150 grams of Boscan asphalt and 6.0 theories of propylene oxide. The reaction was allowed to proceed for a period of 2 hours and 40 minutes at a temperature of 310°± 5°F.

Data from Examples 11 through 22 are included in the following table:

TABLE IV

MODIFICATION OF BOSCAN ASPHALT

| Example | Modifying Agent Type | Theories | Penetration at 77°F. | Original Viscosity 140°F. | Original Viscosity 275°F. | Rolling Thin Film (RTF) Viscosity 140°F. | Rolling Thin Film (RTF) Viscosity 275°F. | Rolling Microfilm On Original Asphalt (RMFO) Viscosity Megapoises 77°F. |
|---|---|---|---|---|---|---|---|---|
| | | (a) | | (b) | (c) | (b) | (d) | |
| Boscan Asphalt (Unmodified) | — | — | 96 | 2.01 | 440 | 5.07 | 691 | 41 |
| 11 | Acetic Anhydride | 1.0 | 102 | 1.91 | 445 | 4.79 | 691 | 30 |
| 12 | do | 2.0 | 105 | 1.84 | 330 | 4.60 | 660 | 18 |
| 13 | do | 10.0 | 101 | 1.99 | 360 | 4.29 | 720 | 14 |
| 14(e) | Methyl Chloride | 2.3 | 101 | 2.19 | 490 | 4.83 | 690 | 21 |
| 15(e) | do | 4.7 | 100 | 2.34 | 496 | 4.23 | 671 | 11 |
| 16 | Ethylene Oxide | 2.14 | 116 | 1.82 | 427 | 4.23 | 639 | 28 |
| 17 | do | 3.4 | 109 | 1.76 | 436 | 4.24 | 627 | 22 |
| 18(f) | do | 2.5 | 77 | 3.63 | 609 | 7.85 | 870 | 42 |
| 19(f) | Ethylene Oxide | 3.6 | 65 | 5.50 | 726 | 11.9 | 1058 | 70 |
| 20 | do | 5.0 | 116 | 1.57 | 404 | 4.15 | 614 | 17 |
| 21 | Propylene Oxide | 3.4 | 121 | 1.51 | 388 | 3.89 | 587 | 27 |
| 22 | do | 6.0 | 130 | 1.39 | 394 | 4.24 | 615 | 26 |

(a) Relative to Non H-Bonded OH in asphalt
(b) Kilopoises
(c) Centistokes
(d) Centipoises
(e) 2 theories each of Na and NaOCH₃ added
(f) 2 theories of Na added As can be seen from these data, the modification of the Boscan asphalt with the enumerated agents is effective in increasing asphalt durability as evidenced by the substantial decrease in RMFO viscosities. It may be noted that in modification with ethylene oxide in Examples 15 and 16, wherein sodium was added, substantial hardening of the asphalt resulted. It is apparent that treatment with the alkylene oxides should be effected in the absence of sodium or other alkali metal.

Thus, the methods of this invention represent effective low-cost means of increasing asphalt durability, and their use is especially applicable to paving asphalts, resulting in greatly added pavement service life.

We claim:

1. A method for enhancing the durability of asphalt containing non-hydrogen bonded hydroxyl groups measured by infrared absorption at a frequency in the range of 3,600–3,650 cm$^{-1}$ which comprises treating the asphalt under substantially oxygen-free and anhydrous conditions, by intimately mixing a modifying compound with the entire asphalt mass at a temperature of from about 150° to 650°F and for a time sufficient to reduce the concentration of non-hydrogen bonded hydroxyl in the asphalt measured by infrared absorption at a frequency in the range of 3,600–3,650 cm$^{-1}$, said modifying compound being selected from the group consisting of:

a. R—NCO, in which R is hydrocarbyl of 1 to 24 carbon atoms;

b.

in which $R_1$ is H or R; X is O, S, or $(-H)_2$ when Y is Cl, Br, or I; X is

when Y is H; and X is O or S when Y is O-acyl wherein said acyl group is a hydrocarbyl acyl of 1 to 20 carbon atoms from a monocarboxylic oxygen or sulfur acid, with the proviso that when the compound to be employed is

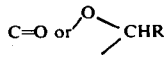

in which X is $(-H)_2$ and Y is Cl, Br, or I, the asphalt, prior to the addition of the modifying compound is reacted with an alkali metal in an amount sufficient to convert the non-hydrogen bonded phenolic hydroxyl groups to alkali metal phenoxide groups, with the further proviso that when the reaction produces hydrogen halide, sufficient base be present in the reaction mixture to substantially neutralize said hydrogen halide; and c. ethylene oxide, with the proviso that when the modifying compound is an alkylene oxide, the treatment is effected in the absence of alkali metals.

2. The method of claim 1 wherein the reaction is carried out in a temperature of from about 250° to 450°F.

3. The method of claim 1 wherein the modifying compound reacted with the asphalt is of the formula

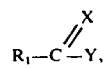

in which X is

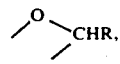

and Y is H.

4. The method of claim 1 in which the modifying compound is ethylene oxide.

5. The method of claim 1 in which the modifying compound is employed in an amount at least equal to 1 theory relative to nonhydrogen-bonded hydroxyl groups in the asphalt as determined by infrared analysis at a frequency in the range of 3,600–3,650 cm$^{-1}$.

6. The method of claim 5 in which the compound is employed in an amount of from 1 to 10 theories.

7. The method of claim 1 in which the modifying compound is of the formula

in which X is $(-H)_2$ and Y is Cl, Br, or I.

8. The method of claim 1 in which the asphalt is a Boscan asphalt having a penetration of about 96° at 77°F., a viscosity of about 2.01 kilopoises at 140°F. and about 440 centistokes at 275°F.

9. The method of claim 1 in which the asphalt is solvent deasphalter bottoms having a penetration of about 109 at 77°F., a viscosity of about 1.12 kilopoises at 140°F. and about 227.1 centistokes at 275°F.

* * * * *